United States Patent
Shadpour et al.

(10) Patent No.: US 11,150,789 B2
(45) Date of Patent: Oct. 19, 2021

(54) METHOD, SYSTEMS, AND MEDIA TO ARRANGE A PLURALITY OF DIGITAL IMAGES WITHIN AN IMAGE DISPLAY SECTION OF A GRAPHICAL USER INTEFACE (GUI)

(71) Applicant: Social Native, Inc., Beverly Hills, CA (US)

(72) Inventors: David Shadpour, Beverly Hills, CA (US); Eytan Elbaz, Beverly Hills, CA (US)

(73) Assignee: SOCIAL NATIVE, INC., Beverly Hills, CA (US)

( * ) Notice: Subject to any disclaimer, the term of this patent is extended or adjusted under 35 U.S.C. 154(b) by 0 days.

(21) Appl. No.: 16/999,965

(22) Filed: Aug. 21, 2020

(65) Prior Publication Data

US 2021/0064200 A1 Mar. 4, 2021

Related U.S. Application Data

(60) Provisional application No. 62/894,476, filed on Aug. 30, 2019.

(51) Int. Cl.
*G06F 3/0484* (2013.01)

(52) U.S. Cl.
CPC ................. *G06F 3/0484* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 9,070,140 B2 | 6/2015 | Allard et al. | |
| 9,471,883 B2 | 10/2016 | Chatterjee et al. | |
| 10,152,695 B1 | 12/2018 | Chiu et al. | |
| 1,029,870 A1 | 5/2019 | Edwards et al. | |
| 10,650,073 B1* | 5/2020 | Manzi | G06F 16/951 |
| 2011/0157226 A1* | 6/2011 | Ptucha | G06T 11/60 |
| | | | 345/638 |
| 2012/0296845 A1 | 11/2012 | Andrews et al. | |
| 2015/0088684 A1 | 3/2015 | Nygaard et al. | |
| 2016/0042375 A1* | 2/2016 | Naqvi | G06Q 30/0261 |
| | | | 705/7.34 |
| 2018/0174106 A1 | 6/2018 | Kenthapadi et al. | |

FOREIGN PATENT DOCUMENTS

WO  WO-2015135600 A1  9/2015

OTHER PUBLICATIONS

U.S. Appl. No. 16/435,419 Office Action dated May 12, 2021.

* cited by examiner

*Primary Examiner* — David E Choi
(74) *Attorney, Agent, or Firm* — Wilson Sonsin Goodrich & Rosati

(57) ABSTRACT

Described are methods, systems, and media for arranging a plurality of images within an image display section of a graphical user interface to optimize the number of image clicks and item purchases.

24 Claims, 6 Drawing Sheets

METHOD, SYSTEMS, AND MEDIA TO ARRANGE A PLURALITY OF DIGITAL IMAGES WITHIN AN IMAGE DISPLAY SECTION OF A GRAPHICAL USER INTEFACE (GUI)

CROSS REFERENCE

This application claims the benefit of U.S. Provisional Application No. 62/894,476, filed Aug. 30, 2019, the contents of which are incorporated herein by reference in its entirety.

BACKGROUND

Many e-commerce applications present images to perspective buyers to advertise the aesthetics, functionality, or both of an item for sale. Current images are randomly arranged, or arranged by the e-commerce institution in a sequence without strategy or optimization towards image clicks or the amount of the items within the image that are bought.

SUMMARY

Provided herein is a computer-implemented method of arranging a plurality of images within an image display section of a graphical user interface comprising: receiving, by a computer, a plurality of image identifiers, each image identifier associated with an item image; assigning, by the computer, a sequential image order to each image identifier; determining, by the computer, an amount of image clicks associated with each item image and an amount of item sales associated with the assigned sequential image order; and automatically reassigning, by the computer, the image order to each of the plurality of image identifiers until a maximum amount of image clicks, a maximum amount item sales, or both is determined.

In some embodiments, automatically reassigning the image order comprises assigning a first order to the image having the highest amount of image clicks. In some embodiments, one or more of the plurality of image identifiers is further associated with a Not Acceptable for First Order tag, and wherein the method assigns and reassigns the sequential image order to each image identifier associated with the Not Acceptable for First Order tag to an order after the first order. In some embodiments, one or more of the plurality of image identifiers is further associated with an immediately preceding image identifier, an immediately subsequent image identifier, or both. In some embodiments, automatically reassigning the image order to each of the plurality of image identifiers comprises assigning all possible combinations of image identifiers and image orders. In some embodiments, the sequential image order is a horizontal sequential order, a vertical sequential order, or an appearance order. In some embodiments, the image associated with the first order of the horizontal sequential order is a left-most image. In some embodiments, the image associated with the first order of the vertical sequential order is an utmost image. In some embodiments, the image associated with the first order of the appearance order is the first appearing image.

Another aspect provided herein is a computer-implemented system comprising: a digital processing device comprising: at least one processor, an operating system configured to perform executable instructions, a memory, and a computer program including instructions executable by the digital processing device to create an application to arrange a plurality of images within an image display section of a graphical user interface, the application performing at least the following: receiving a plurality of image identifiers, each image identifier associated with an item image; assigning a sequential image order to each image identifier; determining an amount of image clicks associated with each item image and an amount of item sales associated with the assigned sequential image order; and automatically reassigning the image order to each of the plurality of image identifiers until a maximum amount of image clicks, a maximum amount item sales, or both is determined.

In some embodiments, automatically reassigning the image order comprises assigning a first order to the image having the highest amount of image clicks. In some embodiments, one or more of the plurality of image identifiers is further associated with a Not Acceptable for First Order tag, and wherein the system assigns and reassigns the sequential image order to each image identifier associated with the Not Acceptable for First Order tag to an order after the first order. In some embodiments, one or more of the plurality of image identifiers is further associated with an immediately preceding image identifier, an immediately subsequent image identifier, or both. In some embodiments, automatically reassigning the image order to each of the plurality of image identifiers comprises assigning all possible combinations of image identifiers and image orders. In some embodiments, the sequential image order is a horizontal sequential order, a vertical sequential order, or an appearance order. In some embodiments, the image associated with the first order of the horizontal sequential order is a left-most image. In some embodiments, the image associated with the first order of the vertical sequential order is an utmost image. In some embodiments, the image associated with the first order of the appearance order is the first appearing image.

Another aspect provided herein is non-transitory computer-readable storage media encoded with a computer program including instructions executable by a processor to create an application for arranging a plurality of images within an image display section of a graphical user interface, the application performing at least the following: receiving a plurality of image identifiers, each image identifier associated with an item image; assigning a sequential image order to each image identifier; determining an amount of image clicks associated with each item image and an amount of item sales associated with the assigned sequential image order; and automatically reassigning the image order to each of the plurality of image identifiers until a maximum amount of image clicks, a maximum amount item sales, or both is determined.

In some embodiments, automatically reassigning the image order comprises assigning a first order to the image having the highest amount of image clicks. In some embodiments, one or more of the plurality of image identifiers is further associated with a Not Acceptable for First Order tag, and wherein the system assigns and reassigns the sequential image order to each image identifier associated with the Not Acceptable for First Order tag to an order after the first order. In some embodiments, wherein one or more of the plurality of image identifiers is further associated with an immediately preceding image identifier, an immediately subsequent image identifier, or both. In some embodiments, automatically reassigning the image order to each of the plurality of image identifiers comprises assigning all possible combinations of image identifiers and image orders. In some embodiments, the sequential image order is a horizontal sequential order, a vertical sequential order, or an appearance order. In some embodiments, the image associated with the first order of the horizontal sequential order is a left-most image. In some embodiments, the image associated with the first order of the vertical sequential order is an utmost image. In some embodiments, the image associated with the first order of the appearance order is the first appearing image.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The methods, system, and media herein arrange a plurality of images within a graphical user interface in an order that achieves optimal number of image clicks and number of item purchases. As potential buyers generally view such product images in the order they are displayed, ensuring that the most popular images are seen first increases product views and sales.

Traditionally, e-commerce websites are limited in the ways in which they can organize item images on their display. Additionally, e-commerce websites use many item images for a large amount of items, making it difficult to find the images most used and that are most successful towards achieving a sale. The typically available ways to organize images are alphabetically, by file size, by file type, or by the instruction of the e-commerce management. If an e-commerce company wants a non-typical arrangement of icons that is optimized for sales, they would need to manually manipulate the images for each individual icon. For example, traditional software does not automatically organize images so that the most clicked images are located near the beginning of an arrangement of images, where they can be easily accessed. Therefore, what is needed is a method that allows for such non-traditional arrangements to be performed automatically. Accordingly, applicant's disclosure addresses this issue by providing a method for rearranging images on a graphical user interface (GUI), wherein the method moves the most used images to a position on the GUI, specifically, closest to the beginning of a sequence of images, based on a determined amount of use. In a first preferred embodiment, the amount of use of each icon is automatically determined by a processor that tracks the number of times each icon is selected over a period of time (e.g., day, week, month, etc.). In another embodiment, the systems, methods, and media herein employ ordering and/or ranking systems known to those skilled in the art.

Methods of Arranging a Plurality of Images within a Graphical User Interface

Figure 1:
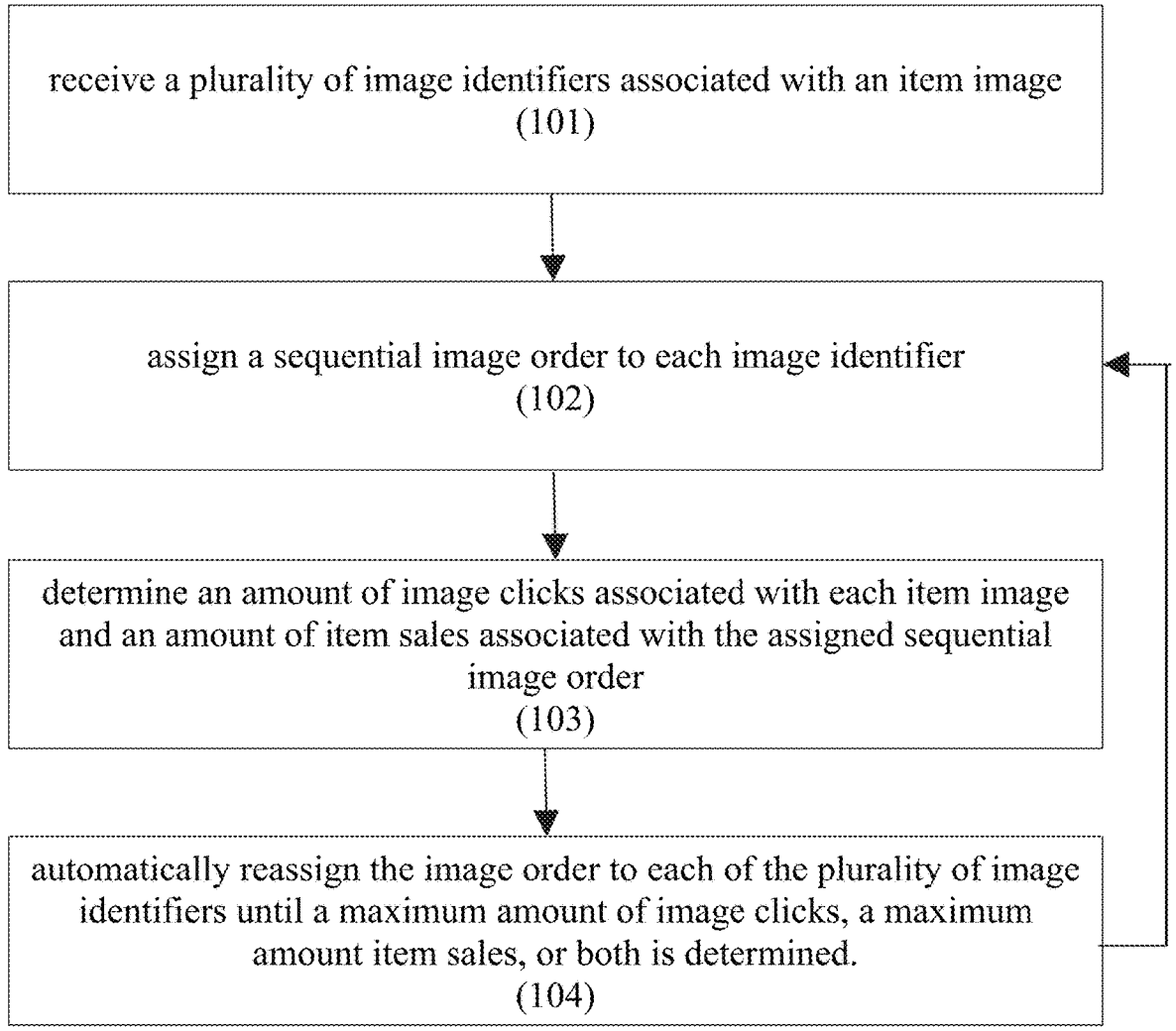
FIG. 1 shows an exemplary computer-implemented method of arranging a plurality of images within an image display section of a graphical user interface, per some embodiments herein.

Provided herein, per FIG. 1, is a computer-implemented method of arranging a plurality of images within an image display section of a graphical user interface. As shown, the method comprises: receiving, by a computer, a plurality of image identifiers, each image identifier associated with an item image 101; assigning, by the computer, a sequential image order to each image identifier 102; determining, by the computer, an amount of image clicks associated with each item image and an amount of item sales associated with the assigned sequential image order 103; and automatically reassigning, by the computer, the image order to each of the plurality of image identifiers until a maximum amount of image clicks, a maximum amount item sales, or both is determined 104. In some embodiments, the image display section of a graphical user interface is displayed on an e-commerce website. In some embodiments, the e-commerce website includes Amazon, Shopify, Demandware, Oracle, WooCommerce, BigCommerce, Etsy, Alibaba, Fiverr, Upwork, Walmart, Macy's, IKEA, Xero, ADP, Square, Soma, eBay, Birchbox, Wayfair, Zappos, social media websites, B2C (business to consumer websites where transactions happen between business and consumers), B2B (business to business websites where ecommerce pertains to transactions conducted between two business), C2B (consumer to business websites where consumer sells or contributes monetary value to a business, e.g., crowdsourcing), C2C (consumer to consumer websites where something is bought and sold between two or more consumers), G2B (government to business websites where transactions take place between a company purchasing for government goods, services, or fees online), B2G (business to government websites where a government entity uses the Internet to purchase goods or services from a business), C2G (consumer to government websites where consumer engages in e-commerce transactions with the government, e.g., paying for traffic tickets or car registration).

Figure 2:
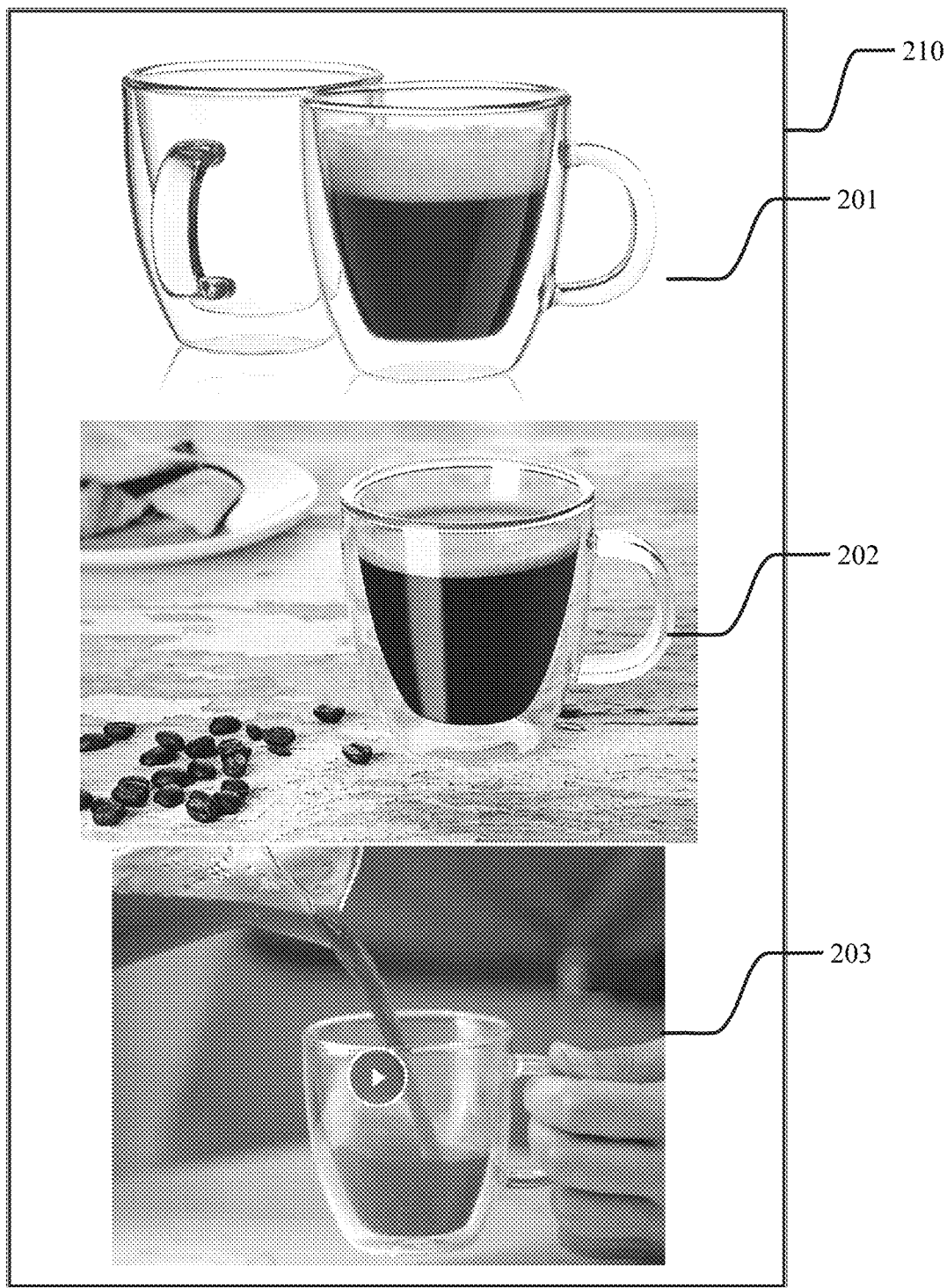
FIG. 2 shows a first exemplary arrangement of images within an image display section of a graphical user interface, per some embodiments herein.
Figure 3:
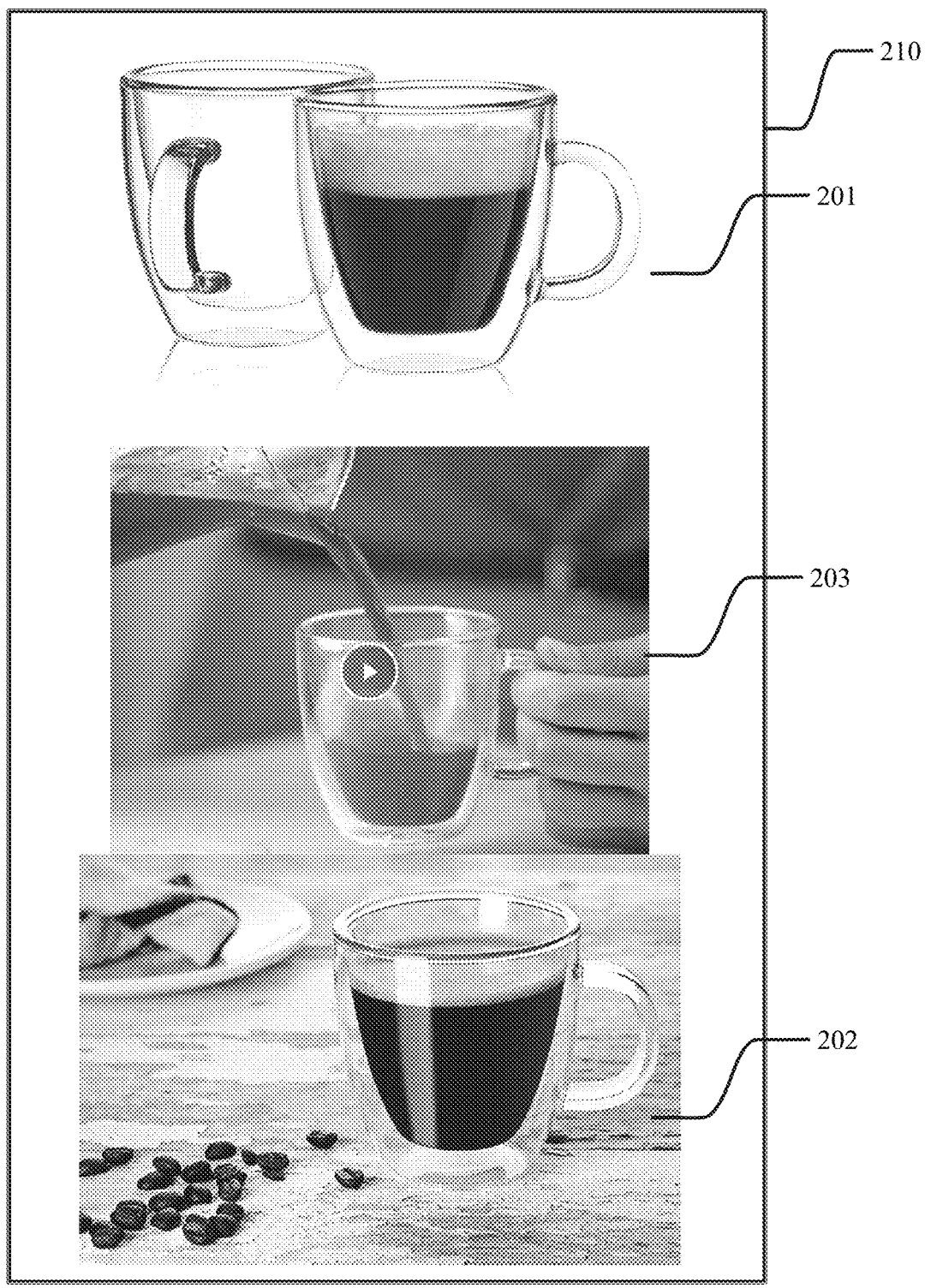
FIG. 3 shows a second exemplary arrangement of images within an image display section of a graphical user interface, per some embodiments herein.

FIGS. 2 and 3 show first and secondary exemplary arrangements of images 201 202 203 within an image display section 210 of a graphical user interface. As shown, the exemplary image display section 210 comprises a first image 201, a second image 202, and a third image 203. As seen therein the third image 203 comprises a video snapshot, whereas clicking on the third image 203 plays a video. Further, the image display section 210 of a graphical user interface of FIG. 2 has a vertical sequential image order, wherein the first image 201 is assigned a first sequential order, wherein the second image 202 is assigned a second sequential order, and wherein the third image 203 is assigned a third sequential order. Alternatively, in some embodiments the image display section 210 of a graphical user interface has a horizontal sequential order, or an appearance order. As shown, 201 202 203 the image associated with the first order of the vertical sequential order is an utmost image. Alternatively, in some embodiments, the image 201 202 203 associated with the first order of the horizontal sequential order is a left-most image. In some embodiments, the image 201 202 203 associated with the first order of the appearance order is the first appearing image.

Once the amount of image clicks are determined for each image 201 202 203 in their respective position, the sequential image orders are reassigned, per FIG. 3, such that the first image 201 is assigned the first sequential order, the second image 202 is assigned the third sequential order, and the third image 203 is assigned the second sequential order. In some embodiments, automatically reassigning the image order 104 comprises assigning a first order to the image 201 202 203 having the highest amount of image clicks.

In some embodiments, one or more of the plurality of image identifiers is further associated with a Not Acceptable for First Order tag, the sequential image order is assigned and/or reassigned to each image identifier associated with the Not Acceptable for First Order tag to an order after the first order. For example some e-commerce regulations require that the first order image has a white background. In such an example, whereas the second image 202 and the third image 203 are assigned a Not Acceptable for First Order tag, the image arrangements shown in FIGS. 2 and 3 would be the only image arrangements that are allowable, and for which the amount of clicks and item sales are determined.

In some embodiments, one or more of the plurality of image identifiers is further associated with an immediately preceding image identifier, an immediately subsequent image identifier, or both. In one example, the first, second, and third images 201 202 203 respectively show primary, secondary, and tertiary sequential actions performed by the item. As such, for this example, associating two or more of: the first image identifier with an immediately subsequent second image identifier, the second image identifier with an immediately preceding first image identifier, the second image identifier with an immediately subsequent third image identifier, or the third image identifier with an immediately preceding second image identifier, maintains the requisite image identifier order.

In some embodiments, automatically reassigning the image order to each of the plurality of image identifiers 104 comprises assigning all possible combinations of image identifiers and image orders. For example, if there are three image identifiers (A, B, C), and none of which are associated with a Not Acceptable for First Order tag, the method would assign and determine an amount of image clicks associated with each item image and an amount of item sales associated with the assigned sequential image order for the following arrangements: ABC, ACB, BAC, BCA, CAB, CBA.

System and Media for Arranging a Plurality of Images within a Graphical User Interface Another aspect provided herein is a computer-implemented system comprising: a digital processing device comprising: at least one processor, an operating system configured to perform executable instructions, a memory, and a computer program including instructions executable by the digital processing device to create an application to arrange a plurality of images within an image display section of a graphical user interface, the application performing at least the following: receiving a plurality of image identifiers, each image identifier associated with an item image; assigning a sequential image order to each image identifier; determining an amount of image clicks associated with each item image and an amount of item sales associated with the assigned sequential image order; and automatically reassigning the image order to each of the plurality of image identifiers until a maximum amount of image clicks, a maximum amount item sales, or both is determined.

In some embodiments, automatically reassigning the image order comprises assigning a first order to the image having the highest amount of image clicks. In some embodiments, one or more of the plurality of image identifiers is further associated with a Not Acceptable for First Order tag, and wherein the system assigns and reassigns the sequential image order to each image identifier associated with the Not Acceptable for First Order tag to an order after the first order. In some embodiments, one or more of the plurality of image identifiers is further associated with an immediately preceding image identifier, an immediately subsequent image identifier, or both. In some embodiments, automatically reassigning the image order to each of the plurality of image identifiers comprises assigning all possible combinations of image identifiers and image orders. In some embodiments, the sequential image order is a horizontal sequential order, a vertical sequential order, or an appearance order. In some embodiments, the image associated with the first order of the horizontal sequential order is a left-most image. In some embodiments, the image associated with the first order of the vertical sequential order is an utmost image. In some embodiments, the image associated with the first order of the appearance order is the first appearing image.

Another aspect provided herein is non-transitory computer-readable storage media encoded with a computer program including instructions executable by a processor to create an application for arranging a plurality of images within an image display section of a graphical user interface, the application performing at least the following: receiving a plurality of image identifiers, each image identifier associated with an item image; assigning a sequential image order to each image identifier; determining an amount of image clicks associated with each item image and an amount of item sales associated with the assigned sequential image order; and automatically reassigning the image order to each of the plurality of image identifiers until a maximum amount of image clicks, a maximum amount item sales, or both is determined.

In some embodiments, automatically reassigning the image order comprises assigning a first order to the image having the highest amount of image clicks. In some embodiments, one or more of the plurality of image identifiers is further associated with a Not Acceptable for First Order tag, and wherein the system assigns and reassigns the sequential image order to each image identifier associated with the Not Acceptable for First Order tag to an order after the first order. In some embodiments, wherein one or more of the plurality of image identifiers is further associated with an immediately preceding image identifier, an immediately subsequent image identifier, or both. In some embodiments, automatically reassigning the image order to each of the plurality of image identifiers comprises assigning all possible combinations of image identifiers and image orders. In some embodiments, the sequential image order is a horizontal sequential order, a vertical sequential order, or an appearance order. In some embodiments, the image associated with the first order of the horizontal sequential order is a left-most image. In some embodiments, the image associated with the first order of the vertical sequential order is an utmost image. In some embodiments, the image associated with the first order of the appearance order is the first appearing image.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 4:
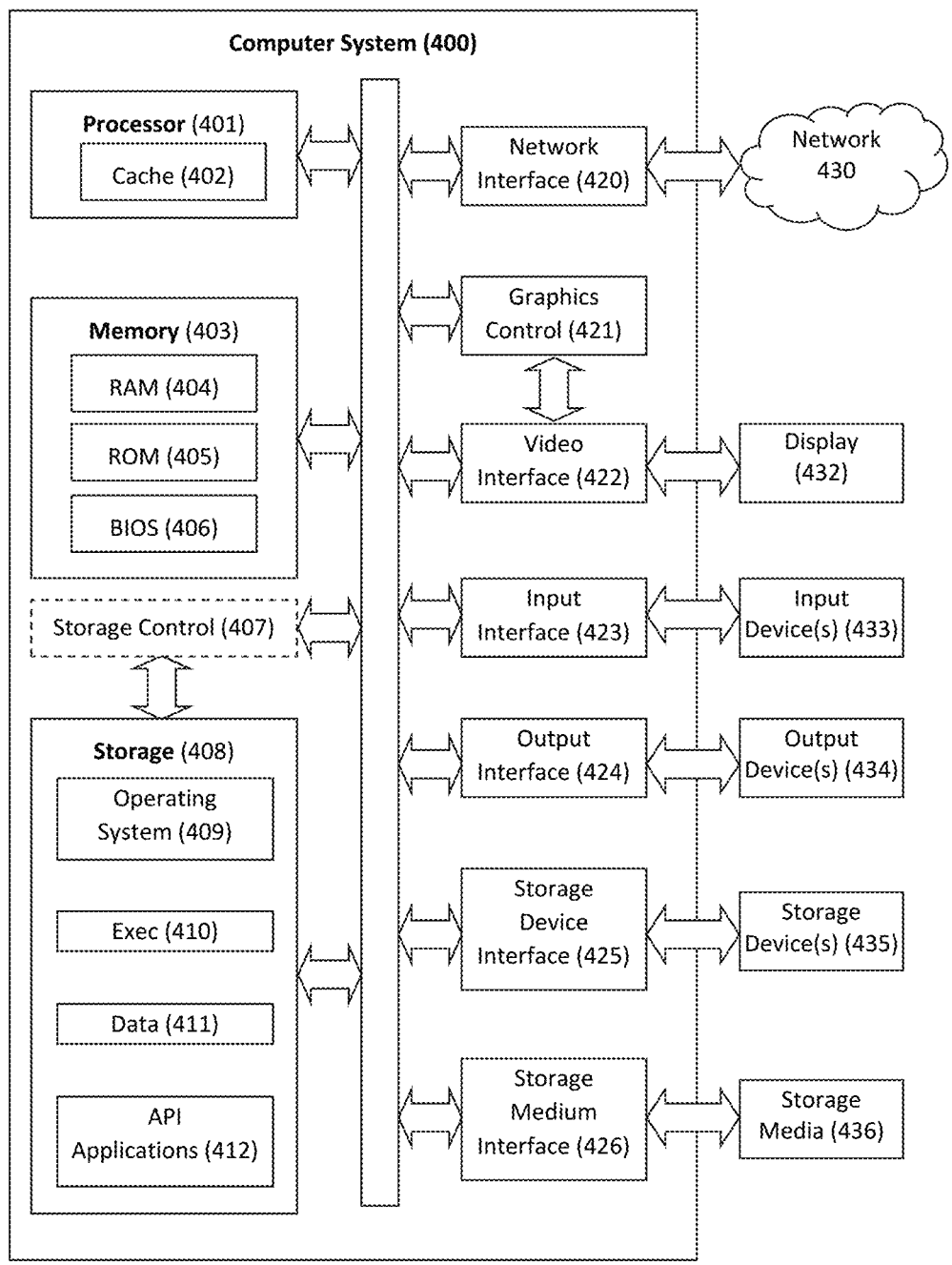
FIG. 4 shows a non-limiting example of a computing device; in this case, a device with one or more processors, memory, storage, and a network interface, per some embodiments herein.

Referring to FIG. 4, a block diagram is shown depicting an exemplary machine that includes a computer system 400 (e.g., a processing or computing system) within which a set of instructions can execute for causing a device to perform or execute any one or more of the aspects and/or methodologies for static code scheduling of the present disclosure. The components in FIG. 4 are examples only and do not limit the scope of use or functionality of any hardware, software, embedded logic component, or a combination of two or more such components implementing particular embodiments.

Computer system 400 may include one or more processors 401, a memory 403, and a storage 408 that communicate with each other, and with other components, via a bus 440. The bus 440 may also link a display 432, one or more input devices 433 (which may, for example, include a keypad, a keyboard, a mouse, a stylus, etc.), one or more output devices 434, one or more storage devices 435, and various tangible storage media 436. All of these elements may interface directly or via one or more interfaces or adaptors to the bus 440. For instance, the various tangible storage media 436 can interface with the bus 440 via storage medium interface 426. Computer system 400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 400 includes one or more processor(s) 401 (e.g., central processing units (CPUs) or general purpose graphics processing units (GPGPUs)) that carry out functions. Processor(s) 401 optionally contains a cache memory unit 402 for temporary local storage of instructions, data, or computer addresses. Processor(s) 401 are configured to assist in execution of computer readable instructions. Computer system 400 may provide functionality for the components depicted in FIG. 4 as a result of the processor(s) 401 executing non-transitory, processor-executable instructions embodied in one or more tangible computer-readable storage media, such as memory 403, storage 408, storage devices 435, and/or storage medium 436. The computer-readable media may store software that implements particular embodiments, and processor(s) 401 may execute the software. Memory 403 may read the software from one or more other computer-readable media (such as mass storage device(s) 435, 436) or from one or more other sources through a suitable interface, such as network interface 420.

The software may cause processor(s) 401 to carry out one or more processes or one or more steps of one or more processes described or illustrated herein. Carrying out such processes or steps may include defining data structures stored in memory 403 and modifying the data structures as directed by the software.

The memory 403 may include various components (e.g., machine readable media) including, but not limited to, a random access memory component (e.g., RAM 404) (e.g., static RAM (SRAM), dynamic RAM (DRAM), ferroelectric random access memory (FRAM), phase-change random access memory (PRAM), etc.), a read-only memory component (e.g., ROM 405), and any combinations thereof. ROM 405 may act to communicate data and instructions unidirectionally to processor(s) 401, and RAM 404 may act to communicate data and instructions bidirectionally with processor(s) 401. ROM 405 and RAM 404 may include any suitable tangible computer-readable media described below. In one example, a basic input/output system 406 (BIOS), including basic routines that help to transfer information between elements within computer system 400, such as during start-up, may be stored in the memory 403.

Fixed storage 408 is connected bidirectionally to processor(s) 401, optionally through storage control unit 407. Fixed storage 408 provides additional data storage capacity and may also include any suitable tangible computer-readable media described herein. Storage 408 may be used to store operating system 409, executable(s) 410, data 411, applications 412 (application programs), and the like. Storage 408 can also include an optical disk drive, a solid-state memory device (e.g., flash-based systems), or a combination of any of the above. Information in storage 408 may, in appropriate cases, be incorporated as virtual memory in memory 403.

In one example, storage device(s) 435 may be removably interfaced with computer system 400 (e.g., via an external port connector (not shown)) via a storage device interface 425. Particularly, storage device(s) 435 and an associated machine-readable medium may provide non-volatile and/or volatile storage of machine-readable instructions, data structures, program modules, and/or other data for the computer system 400. In one example, software may reside, completely or partially, within a machine-readable medium on storage device(s) 435. In another example, software may reside, completely or partially, within processor(s) 401.

Bus 440 connects a wide variety of subsystems. Herein, reference to a bus may encompass one or more digital signal lines serving a common function, where appropriate. Bus 440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 400 may also include an input device 433. In one example, a user of computer system 400 may enter commands and/or other information into computer system 400 via input device(s) 433. Examples of an input device(s) 433 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 433 may be interfaced to bus 440 via any of a variety of input interfaces 423 (e.g., input interface 423) including, but not limited to, serial, parallel, game port, USB, FIREWIRE, THUNDERBOLT, or any combination of the above.

In particular embodiments, when computer system 400 is connected to network 430, computer system 400 may communicate with other devices, specifically mobile devices and enterprise systems, distributed computing systems, cloud storage systems, cloud computing systems, and the like, connected to network 430. Communications to and from computer system 400 may be sent through network interface 420. For example, network interface 420 may receive incoming communications (such as requests or responses from other devices) in the form of one or more packets (such as Internet Protocol (IP) packets) from network 430, and computer system 400 may store the incoming communications in memory 403 for processing. Computer system 400 may similarly store outgoing communications (such as requests or responses to other devices) in the form of one or more packets in memory 403 and communicated to network 430 from network interface 420. Processor(s) 401 may access these communication packets stored in memory 403 for processing.

Examples of the network interface 420 include, but are not limited to, a network interface card, a modem, and any combination thereof. Examples of a network 430 or network segment 430 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 430, may employ a wired and/or a wireless mode of communication. In general, any network topology may be used.

Information and data can be displayed through a display 432. Examples of a display 432 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 432 can interface to the processor(s) 401, memory 403, and fixed storage 408, as well as other devices, such as input device(s) 433, via the bus 440. The display 432 is linked to the bus 440 via a video interface 422, and transport of data between the display 432 and the bus 440 can be controlled via the graphics control 421. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 432, computer system 400 may include one or more other peripheral output devices 434 including, but not limited to, an audio speaker, a printer, a storage device, and any combinations thereof. Such peripheral output devices may be connected to the bus 440 via an output interface 424. Examples of an output interface 424 include, but are not limited to, a serial port, a parallel connection, a USB port, a FIREWIRE port, a THUNDERBOLT port, and any combinations thereof.

In addition or as an alternative, computer system 400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® P53®, Sony® P54®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 5:
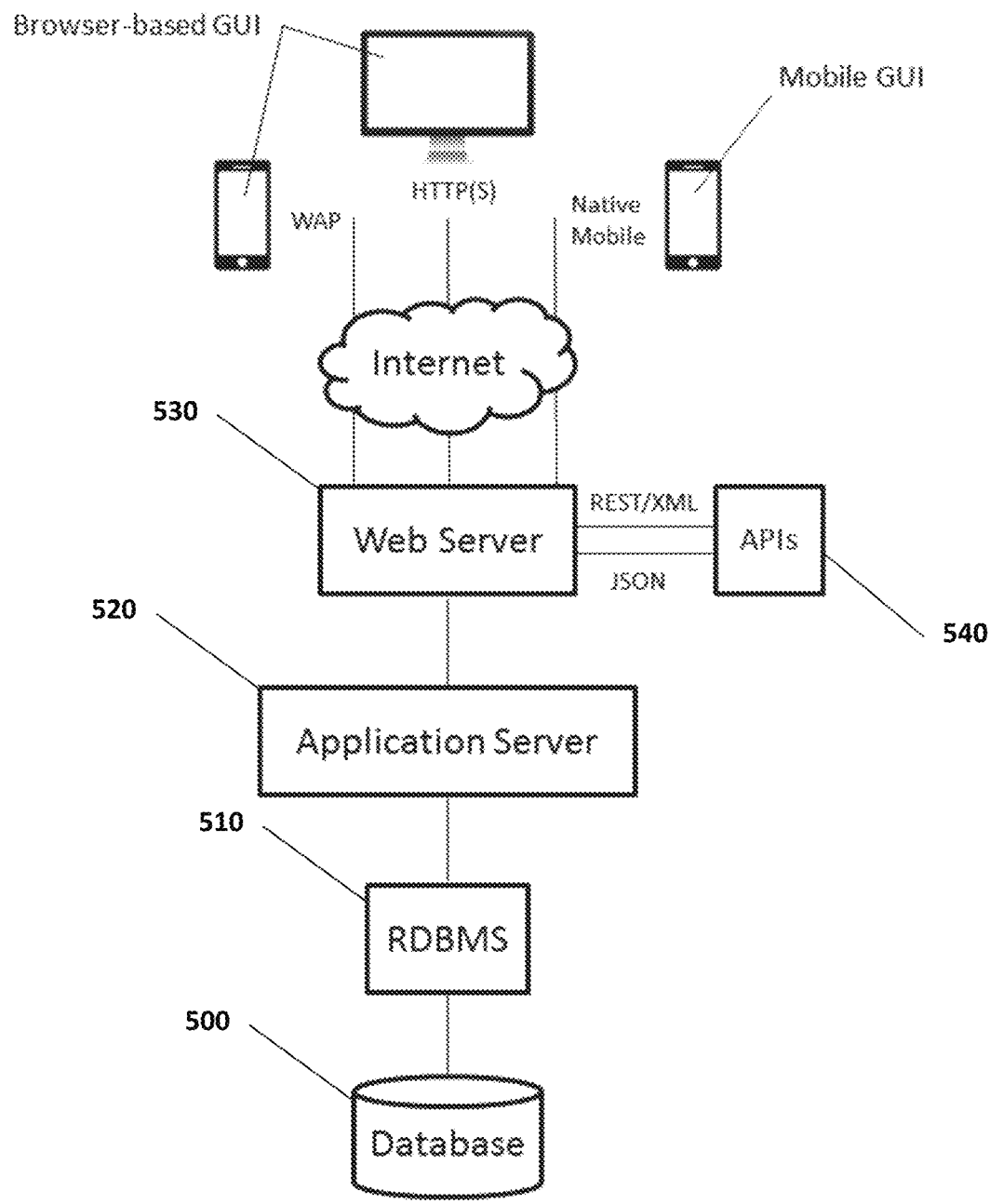
FIG. 5 shows a non-limiting example of a web/mobile application provision system; in this case, a system providing browser-based and/or native mobile user interfaces, per some embodiments herein.

Referring to FIG. 5, in a particular embodiment, an application provision system comprises one or more databases 500 accessed by a relational database management system (RDBMS) 510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 520 (such as Java servers, .NET servers, PHP servers, and the like) and one or more web servers 530 (such as Apache, IIS, GWS and the like). The web server(s) optionally expose one or more web services via app application programming interfaces (APIs) 540. Via a network, such as the Internet, the system provides browser-based and/or mobile native user interfaces.

Figure 6:
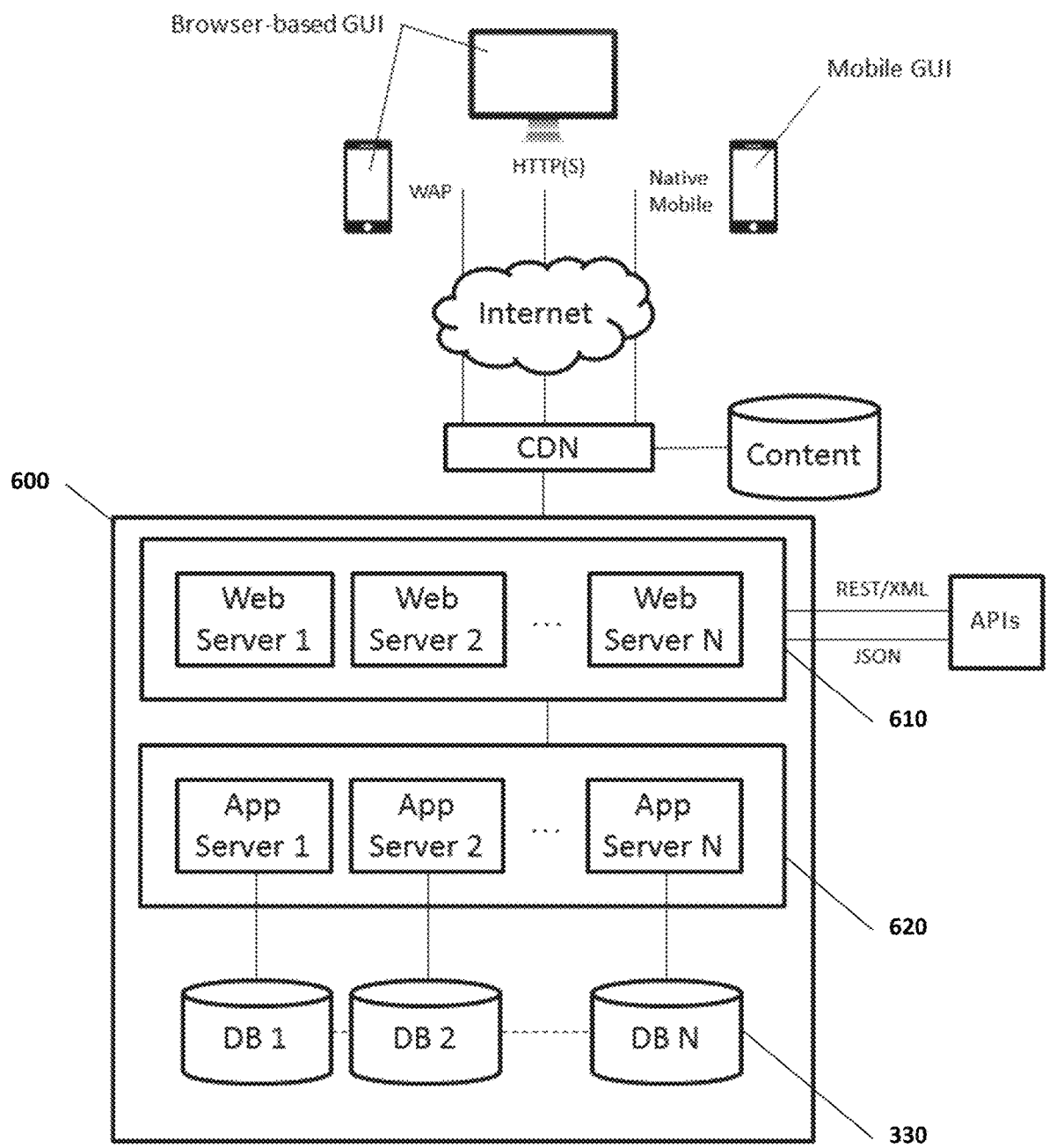
FIG. 6 shows a non-limiting example of a cloud-based web/mobile application provision system; in this case, a system comprising an elastically load balanced, auto-scaling web server and application server resources as well as synchronously replicated databases, per some embodiments herein.

Referring to FIG. 6, in a particular embodiment, an application provision system alternatively has a distributed, cloud-based architecture 600 and comprises elastically load balanced, auto-scaling web server resources 610 and application server resources 620 as well synchronously replicated databases 630.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of images, image identifiers, an amount of clicks, and an amount of sales. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A computer-implemented method of arranging a plurality of e-commerce images within an image display section of a graphical user interface comprising:
   (a) receiving, by a computer, a plurality of e-commerce images, each e-commerce image associated with an e-commerce item, wherein the plurality of e-commerce images comprises at least one e-commerce image associated with a Not Acceptable for First Order tag, and arranging, by the computer, a plurality of sequences of e-commerce images, wherein every arranged sequence simultaneously comprises: (i) a unique sequence of e-commerce images; and (ii) the at least one e-commerce image associated with a Not Acceptable for First Order tag is not at the beginning of any sequence;
   (b) assigning, by the computer, a sequential image order to each e-commerce image within every sequence;
   (c) determining, by the computer, (i) an amount of image clicks associated with each e-commerce image within a click period of time and (ii) an amount of item sales associated with each sequence for a sale period; and
   (d) automatically reassigning, by the computer, the sequential image order, the automatic reassigning comprising: (i) initially reassigning an e-commerce image with a highest amount of image clicks within the click period of time to the beginning of the sequence; and (ii) then reassigning the initial reassignment until simultaneously both (A) the at least one e-commerce image identifier associated with a Not Acceptable for First Order tag is not at the start of the sequence; and (B) a maximum amount of item sales for the sale period of time is determined.

2. The method of claim 1, wherein one or more of the plurality of e-commerce images is further associated with an immediately preceding image tag, an immediately subsequent image tag, or both; wherein every arranged sequence further simultaneously comprises every e-commerce image tagged with the immediately preceding image tag, immediately subsequent image tag or both be disposed in that arranged sequence accordingly; wherein the reassigning the initial reassignment further comprises every e-commerce image tagged with the immediately preceding image tag, immediately subsequent image tag or both be disposed in that arranged sequence accordingly.

3. The method of claim 1, wherein the sequential image order is a horizontal sequential order, a vertical sequential order, or an appearance order.

4. The method of claim 3, wherein the image associated with the first order of the horizontal sequential order is a left-most image.

5. The method of claim 3, wherein the image associated with the first order of the vertical sequential order is an utmost image.

6. The method of claim 3, wherein the image associated with the first order of the appearance order is the first appearing image.

7. A computer-implemented system comprising: a digital processing device comprising: at least one processor, an operating system configured to perform executable instructions, a memory, and a computer program including instructions executable by the digital processing device to create an application to arrange a plurality of e-commerce images within an image display section of a graphical user interface, the application performing at least the following:
   (a) receiving a plurality of e-commerce images, each e-commerce image associated with an e-commerce item, wherein the plurality of e-commerce images comprises at least one e-commerce image associated with a Not Acceptable for First Order tag, and arranging a plurality of sequences of e-commerce images, wherein every arranged sequence simultaneously comprises: (i) a unique sequence of e-commerce images; and (ii) the at least one e-commerce image associated with a Not Acceptable for First Order tag is not at the beginning of any sequence;
   (b) assigning a sequential image order to each e-commerce image within every sequence;
   (c) determining (i) an amount of image clicks associated with each e-commerce image within a click period of time and (ii) an amount of item sales associated with each sequence for a sale period; and
   (d) automatically reassigning the sequential image order, the automatic reassigning comprising: (i) initially reassigning an e-commerce image with a highest amount of image clicks within the click period of time to the beginning of the sequence; and (ii) then reassigning the initial reassignment until simultaneously both (A) the at least one e-commerce image identifier associated with a Not Acceptable for First Order tag is not at the start of the sequence; and (B) a maximum amount of item sales for the sale period of time is determined.

8. The system of claim 7, wherein one or more of the plurality of e-commerce images is further associated with an immediately preceding image tag, an immediately subsequent image tag, or both; wherein every arranged sequence further simultaneously comprises every e-commerce image tagged with the immediately preceding image tag, immediately subsequent image tag or both be disposed in that arranged sequence accordingly; wherein the reassigning the initial reassignment further comprises every e-commerce image tagged with the immediately preceding image tag, immediately subsequent image tag or both be disposed in that arranged sequence accordingly.

9. The system of claim 7, wherein the sequential image order is a horizontal sequential order, a vertical sequential order, or an appearance order.

10. The system of claim 9, wherein the image associated with the first order of the horizontal sequential order is a left-most image.

11. The system of claim 9, wherein the image associated with the first order of the vertical sequential order is an utmost image.

12. The system of claim 9, wherein the image associated with the first order of the appearance order is the first appearing image.

13. A non-transitory computer-readable storage media encoded with a computer program including instructions executable by a processor to create an application for arranging a plurality of e-commerce images within an image display section of a graphical user interface, the application performing at least the following:
   (a) receiving a plurality of e-commerce images, each e-commerce image associated with an e-commerce item, wherein the plurality of e-commerce images comprises at least one e-commerce image associated with a Not Acceptable for First Order tag, and arranging a plurality of sequences of e-commerce images, wherein every arranged sequence simultaneously comprises: (i) a unique sequence of e-commerce images; and (ii) the at least one e-commerce image associated with a Not Acceptable for First Order tag is not at the beginning of any sequence;
   (b) assigning a sequential image order to each e-commerce image within every sequence;
   (c) determining (i) an amount of image clicks associated with each e-commerce image within a click period of time and (ii) an amount of item sales associated with each sequence for a sale period assigned sequential image order; and
   (d) automatically reassigning the sequential image order, the automatic reassigning comprising: (i) initially reassigning an e-commerce image with a highest amount of image clicks within the click period of time to the beginning of the sequence; and (ii) then reassigning the initial reassignment until simultaneously both (A) the at least one e-commerce image identifier associated with a Not Acceptable for First Order tag is not at the start of the sequence; and (B) a maximum amount of item sales for the sale period of time is determined.

14. The media of claim 13, wherein one or more of the plurality of e-commerce images is further associated with an immediately preceding image tag, an immediately subsequent image tag, or both; wherein every arranged sequence further simultaneously comprises every e-commerce image tagged with the immediately preceding image tag, immediately subsequent image tag or both be disposed in that arranged sequence accordingly; wherein the reassigning the initial reassignment further comprises every e-commerce image tagged with the immediately preceding image tag, immediately subsequent image tag or both be disposed in that arranged sequence accordingly.

15. The media of claim 13, wherein the sequential image order is a horizontal sequential order, a vertical sequential order, or an appearance order.

16. The media of claim 15, wherein the image associated with the first order of the horizontal sequential order is a left-most image.

17. The media of claim 15, wherein the image associated with the first order of the vertical sequential order is an utmost image.

18. The media of claim 15, wherein the image associated with the first order of the appearance order is the first appearing image.

19. The method of claim 1, the method further comprising displaying, by the computer, at least one arranged sequence over the GUI.

20. The method of claim 1, wherein the sale period of time comprises the amount of sales associated with an e-commerce item within a day, week, or month.

21. The system of claim 7, the system further comprising displaying at least one arranged sequence over the GUI.

22. The system of claim 7, wherein the sale period of time comprises the amount of sales associated with an e-commerce item within a day, week, or month.

23. The media of claim 13, the media further comprising displaying at least one arranged sequences over the GUI.

24. The media of claim 13, wherein the sale period of time comprises the amount of sales associated with an e-commerce item within a day, week, or month.

* * * * *